United States Patent [19]

Mai

[11] 3,977,464
[45] Aug. 31, 1976

[54] ROTARY STORAGE HEAT EXCHANGER STRUCTURE

[75] Inventor: Horst Mai, Nuremberg, Germany

[73] Assignee: Maschinenfabrik Augsburg-Nuremberg AG, Nuremberg, Germany

[22] Filed: Dec. 20, 1973

[21] Appl. No.: 426,904

[30] Foreign Application Priority Data

Dec. 20, 1972 Germany............................ 2262226

[52] U.S. Cl................................ 165/9; 60/39.51 H
[51] Int. Cl.² ............................................ F28D 19/00
[58] Field of Search ................. 165/5, 9; 60/39.51 H

[56] References Cited
UNITED STATES PATENTS

| | | | |
|---|---|---|---|
| 1,970,127 | 8/1934 | Colby et al. | 165/5 |
| 2,836,398 | 5/1958 | Linderoth | 165/5 |
| 3,003,750 | 10/1961 | Hess | 165/9 |
| 3,122,200 | 2/1964 | Koch | 165/9 |
| 3,155,154 | 11/1964 | Wilson | 165/9 |
| 3,211,213 | 10/1965 | Baxley et al. | 165/9 |
| 3,374,829 | 3/1968 | Veser et al. | 165/9 X |
| 3,651,862 | 3/1972 | Ballinger | 165/5 |
| 3,667,220 | 6/1972 | Debeyser | 165/9 X |

FOREIGN PATENTS OR APPLICATIONS 1,093,392   11/1960   Germany ................................ 165/5

*Primary Examiner*—Albert W. Davis, Jr.
*Attorney, Agent, or Firm*—Walter Becker

[57] ABSTRACT

A rotary storage heat exchanger structure for multishaft gas turbines, especially motor vehicle gas turbines. The same is arranged in a housing and is provided with one or more rotatable disc-shaped storage bodies having flow passages which extend substantially parallel to the axis of rotation of the storage body or bodies. There are hot exhaust gases and colder compressed working air passed through the passages. The storage body or each of the storage bodies is journaled in a housing web in an overhung position or is journaled at two bearing areas in a housing web or in a housing web and another structural part of the gas turbine. In spaced relationship to the storage body, nozzle gap means are provided on or in the housing in the extended plane separating the working air flow and exhaust gas flow play is provided between the storage body and the pertaining housing web and the inner working air and exhaust gas flow conducting devices.

5 Claims, 2 Drawing Figures

ROTARY STORAGE HEAT EXCHANGER STRUCTURE

The present invention relates to a rotary storage heat exchanger arranged in a housing, for multishaft gas turbines, especially motor vehicle gas turbines, there are provided one or more rotary disc-shaped storage bodies having flow passages which are parallel to the axis of rotation of said rotary storage heat exchanger through these passages hot exhaust gases and colder compressed working air are passed, the storage body or bodies, in an overhung position can be journaled in one housing web or in a housing web and another structural part of the gas turbine at two bearing areas.

Heat exchangers are utilized in connection with gas turbines in order to improve the thermal degree of efficiency and to reduce the relatively high fuel consumption as it occurs in gas turbine driving mechanisms for vehicles.

Of particular importance is a highly satisfactory sealing of rotary storage heat exchangers because the magnitude of the leakage loss results in reducing the efficiency of the gas turbine installation to approximately the same extent. Heretofore, for inner as well as outer seals on the housing, stationary sliding seals with bellows were utilized while a certain pressure pressed the seals against the surface of the rotary storage heat exchanger. With these heretofore known seals, however, due to unavoidable clearance losses, leakage of the magnitude of from 4 to 5% could not be avoided. The major portion of the leakage air escaped through the central housing webs which support the inner seals and serve for journaling the rotary shaft of the rotary storage heat exchanger because it is at this place where the clearance gaps are located. Furthermore, these heretofore known seals are also rather expensive and the driving output for the rotary storage heat exchanger is, relatively high in view of the relatively high friction between the seals and the surfaces of the heat exchanger. Moreover, also the wear at the storage bodies of the rotary storage heat exchanger, particularly in view of the seals of the central housing webs is high with the result that the clearance losses increase in the course of time and that the storage bodies and seals have to be replaced.

It is, therefore, an object of the present invention to reduce the above mentioned drawbacks and to provide a rotary heat exchanger with a contact-free inner seal.

These and other objects and advantages of the invention will appear more clearly from the following specification, in connection with the accompanying drawing, in which.

Figure 1:
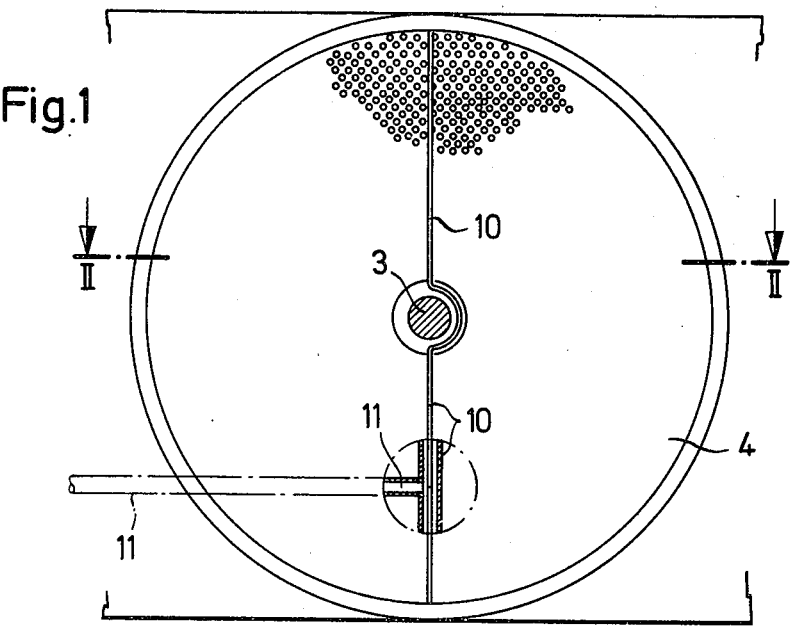
FIG. 1 is a section taken along the line I—I of FIG. 2, and shows a side view of a storage body with the nozzle gap according to the invention.

The rotary storage heat exchanger according to the present invention is characterized primarily in that on or in the housing in the extended separating plane of the working air and the exhaust gas flow and in spaced relationship to the storage body there is provided one nozzle gap or one nozzle gap each actuated by barrier compressed air. Furthermore play is provided between the storage body or between the storage body and the housing web as well as the inner working air and exhaust gas guiding devices.

The advantages realized with an arrangement of this type consist in that due to the leakage loss being considerably reduced, the thermal degree of efficiency of the turbine is materially increased and the specific fuel consumption is reduced substantially to the same extent. Another advantage is seen in the fact that the driving output for the rotary heat exchanger is reduced and also the costs as well as the servicing for the inner seals are reduced.

A further increase in the degree of efficiency of the gas turbine installation is obtained by a further feature of the invention. Thus for discharging of the barrier air leaving the rotary storage heat exchanger into the working air leaving the same there is provided one guiding device or one guiding device each with a nose directed toward the storage body and arranged in a contact-free manner with regard to the latter, the nose is provided on that side which is adjacent to the exhaust gas. This increase in the degree of efficiency is due to the fact that the compressor has to compress less air for the combustion in the combustion chamber and consequently requires less driving power.

According to a further development of the invention, the nozzle gap or gaps can be arranged on that side of the storage body which is located opposite the housing web. The guiding device or devices can be arranged on the side of the housing web. These features bring about the advantage that on the heretofore known gas turbine installations no major structural changes are necessary because it is not necessary to displace the housing web or webs.

Other advantageous features of the invention consist in that as barrier compressed air relatively cool compressed air is utilized which is withdrawn from the compressed air in the installation itself. Furthermore, each housing web or webs has, or have, a solid cross section. The advantage of these steps is seen in particular in the fact that the housing web or webs is, or are, cooled by the barrier air so that it is no longer necessary to separately cool the housing web or webs. The housing web or webs may, therefore, have a hollow space-free cross section which decreases the structural expenses and the weight of the turbine. Moreover, the barrier compressed air keeps the flow passages of the storage body or bodies clean of soil at the side of the exhaust gases.

Referring now to the drawing in detail, from a non-illustrated compressor of a gas turbine installation with two or more shafts, working air 1 is conveyed through a conduit 2 to one section of a disc-shaped storage body (matrix) 4 which is permeable and rotatable about a horizontal axis 3. The other section is passed through by an exhaust gas 5 in a direction opposite to the direction of flow of the working air 1. The exhaust gas flow 5 is conveyed to said other section from a two-stage turbine 6 (only parts of which are shown), through a conduit 7.

The storage body 4 is of a design known per se, and by means of its shaft 3 is journaled in a housing web 8 and in a housing cover. The outer and circumferential seal of the storage body 4 is effected by means of heretofore known slide seals 9 with bellows firmly mounted on the housing.

The inner seal of the storage body 4 is effected by a contact-free barrier compressed air seal. To this end, a nozzle gap 10 is provided on that side of the storage body 4 which is located opposite the housing web 8, in or on a housing part and in spaced relationship to the storage body 4. The nozzle gap 10 is arranged by way of a conduit 11 in any suitable manner to be connected to a non-illustratedd source of compressed air. In FIG. 1, this conduit 11 is indicated only by dot-dash lines because it is actually not visible in the section of FIG. 1. The nozzle gap 10 is located in the separating plane of the two gas flows 1 and 5 which means that the vertical elevational projection of the nozzle gap 10 aside from the semicircular circumvention of the shaft 3 will be located in the vertical plane through the shaft 3 and will be actuated by compressed air, the pressure of which is higher than the pressure of the working air 1. For a better understanding, FIG. 1 illustrates a portion of the nozzle gap 10 and conduit 11 at the level of the section I—I in FIG. 2 on an enlarged scale.

The housing web 8, in contrast to heretofore known constructions is no longer hollow on the inside, but has a solid cross section. It serves simultaneously as a guiding device for discharging the barrier air which leaves the storage body 4 into the working air 1. To this end, the housing web 8 extends similar to the nozzle gap 10 over the entire diameter of the storage body 4 which, however, is not illustrated. The housing web 8 on the side of the exhaust gas flow 5 is provided with a nose 12 directed toward the storage body 4. The nose 12 does not contact the storage body 4. The gap 13 existing between the nose 12 and the storage body 4 is kept as small as possible. Inasmuch as the barrier air passes past the gap 13 at high speed, there occurs an injector effect toward the air side while flue gas is drawn in through the gap 13 into the air flow. This is favorable for the combustion.

The design of the housing web 8 as a hollow space-free structural element has become possible because relatively cool compressed air drawn from the compressed air network of the installation itself is utilized as barrier air. This compressed air cools the housing web 8 after having passed through the storage body 4 so efficiently that the housing web 8 no longer has to be cooled by a separate cooling blower as was heretofore necessary.

The preheated working air 1 which leaves the rotary storage heat exchanger is, in a manner known per se, conveyed to a combustion chamber 14 where fuel is injected and a combustion occurs. The thus formed gas-air mixture expands in the above mentioned turbine 6.

Figure 2:
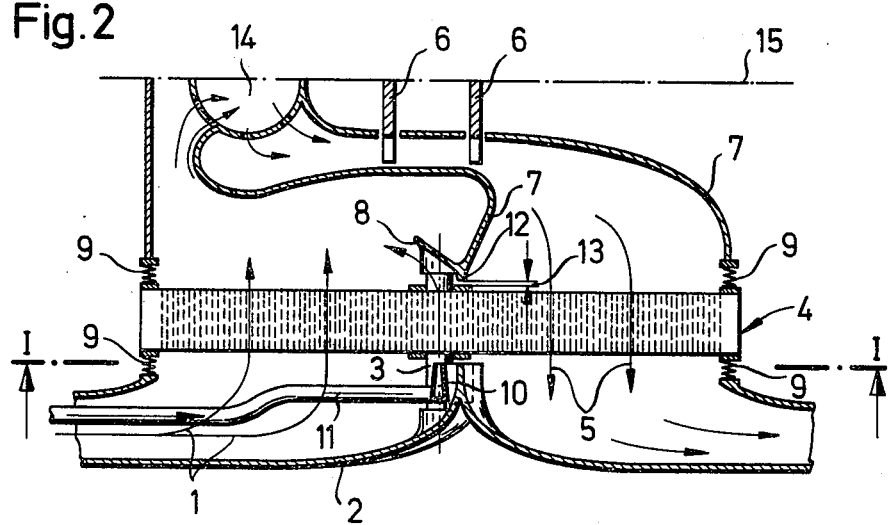
FIG. 2 is a section taken along the line II—II of FIG. 1, and illustrates a rotary storage heat exchanger with parts of the adjacent gas turbine.

The turbine 6 in a manner known per se is equipped with two rotatable storage bodies of which in FIG. 2, for reasons of saving space, only one storage body 4 has been illustrated. The two storage bodies are arranged symmetrically with regard to the turbine shafts which are only diagrammatically indicated by a dot-dash line 15. The non-illustrated storage body is built, journaled and sealed in a manner analogous to the illustrated and described storage body 4.

It is to be understood that the design according to the present invention is not limited to gas turbines with two rotatable storage bodies but may also be employed in the same manner with gas turbine installations having only one rotatable storage body.

It is furthermore to be understood that the present invention is, by no means, limited to the specific showing in the drawing but also comprises any modifications within the scope of the appended claims.

What I claim is:

1. A seal for heat exchanger structure for multi-shaft motor vehicle gas turbines which includes in combination: housing means with inner first and second passage means for respectively conveying working air to a combustion chamber and conveying exhaust gases through said heat exchanger to a gas turbine, rotary storage heat exchanger means including rotatable disc-shaped storage body means with flow passage means extending substantially parallel to the axis of rotation of said storage body means for respectively passing hot exhaust gases and cooler compressed working air therethrough, said flow passage means communicating with said first and second passage means, said first and second passage means including housing web means separating said first and second passage means from each other, nozzle gap means provided along the extended plane of said housing web means and arranged within said housing means in spaced relationship to said storage body means, said nozzle gap means being connectable to a source of sealing compressed barrier air, said storage body means being located relative to said housing web means and said flow passage means so as to have play therebetween, guiding wall means associated with said storage body means and having a nose directed toward the same but in spaced relationship thereto, for deviating barrier air passing through said heat exchanger means into that one of said first and second passage means intended for conveying working air, said nose being located on that side which is adjacent the passage means for the exhaust gas.

2. A heat exchanger structure in combination according to claim 1, in which said guiding wall means forms a part of said housing web means.

3. A heat exchanger structure in combination according to claim 1, in which said nozzle gap means and said guiding wall means are located on opposite sides of said storage body means, said nozzle gap means being located slotted on the influx side of said storage body means for the working air.

4. A heat exchanger structure in combination according to claim 1, in which said housing web means has a solid cross section.

5. A heat exchanger structure in combination according to claim 1, which includes a compressed air network, having conduit means leading to said nozzle gap means.

* * * * *